US009060542B2

(12) United States Patent
Nakajima et al.

(10) Patent No.: US 9,060,542 B2
(45) Date of Patent: Jun. 23, 2015

(54) *CHLORELLA* EXTRACT-CONTAINING PRODUCT AND METHOD FOR IMPROVING THE STORAGE STABILITY OF THE SAME

(75) Inventors: Yoshio Nakajima, Higashiosaka (JP); Yoko Kondo, Higashiosaka (JP)

(73) Assignee: SUN CHLORELLA CORP., Kyoto-shi, Kyoto (JP)

( * ) Notice: Subject to any disclaimer, the term of this patent is extended or adjusted under 35 U.S.C. 154(b) by 229 days.

(21) Appl. No.: 13/457,892

(22) Filed: Apr. 27, 2012

(65) Prior Publication Data

US 2012/0269949 A1  Oct. 25, 2012

Related U.S. Application Data

(60) Division of application No. 12/700,332, filed on Feb. 4, 2010, now Pat. No. 8,187,641, which is a continuation-in-part of application No. PCT/JP2008/064063, filed on Aug. 5, 2008.

(30) Foreign Application Priority Data

Aug. 6, 2007  (JP) .................................. 2007-204376
Apr. 4, 2008  (JP) .................................. 2008-98686

(51) Int. Cl.
*A01N 65/00* (2009.01)
*A23L 2/44* (2006.01)
*A23L 3/3472* (2006.01)
*A23L 1/337* (2006.01)
*A23L 2/52* (2006.01)

(52) U.S. Cl.
CPC .................. *A23L 2/44* (2013.01); *A23L 3/3472* (2013.01); *A23L 1/337* (2013.01); *A23L 2/52* (2013.01)

(58) Field of Classification Search
CPC .............................. A61K 36/00; A61K 35/05
USPC .......................................................... 424/725
See application file for complete search history.

(56) References Cited

FOREIGN PATENT DOCUMENTS

| CN | 1555739 | * | 12/2004 |
| JP | 10028567 | * | 2/1998 |
| JP | 411046738 | * | 2/1999 |
| JP | 2002186469 | * | 7/2002 |
| KR | 2001011375 | * | 2/2001 |
| KR | 2006082215 | * | 7/2006 |

* cited by examiner

*Primary Examiner* — Michael Meller
(74) *Attorney, Agent, or Firm* — McGlew and Tuttle, P.C.

(57) ABSTRACT

A *chlorella* extract-containing product of excellent safety and storage stability is provided without using a benzoate, which is a common preservative. A *chlorella* extract-containing product containing a capsicum extract at 0.020-1.63% by weight on a dry weight basis relative to a *chlorella* extract in an aqueous liquid for drinking having the *chlorella* extract as an principal ingredient. This *chlorella* extract-containing product is to be used as a *chlorella*-containing beverage or a *chlorella*-containing food additive. A method for improving the storage stability of a *chlorella* extract-containing product, comprising adding a capsicum extract to a *chlorella* extract at 0.020-1.63% by weight on a dry weight basis in an aqueous liquid for drinking having the *chlorella* extract as an principal ingredient.

12 Claims, No Drawings

CHLORELLA EXTRACT-CONTAINING PRODUCT AND METHOD FOR IMPROVING THE STORAGE STABILITY OF THE SAME

CROSS REFERENCE TO RELATED APPLICATIONS

This application is a divisional under 37 CFR 1.53(b) of prior application Ser. No. 12/700,332 filed Feb. 4, 2010 now U.S. Pat. No. 8,187,641 and claims the benefit (35 U.S.C. §120 and 365(c)) of International Application PCT/JP2008/064063 of Aug. 5, 2008, which designated inter alia the United States and which claims the priority of Japanese Patent Application JP 2007-204376 of Aug. 6, 2007 and Japanese Patent Application JP 2008-98686 filed Apr. 4, 2008, the entire contents of each application are incorporated herein by reference.

FIELD OF THE INVENTION

The present invention relates to a *chlorella* extract-containing beverage, a *chlorella* extract-containing product including a food additive, and a method for improving the storage stability thereof. Specifically, the present invention relates to a *chlorella* extract-containing product of excellent storage stability and a method for improving the storage stability of a *chlorella* extract-containing product.

BACKGROUND OF THE INVENTION

Green algae of the genus *Chlorella* are widely distributed on the Earth, from the Frigid Zones to the Torrid Zone, and are single-cell organisms of nearly spherical form measuring 2-10 μm (micrometer) in diameter. The utility of *chlorella* has been mentioned variously in folklore and academic reports; representative effects thereof include animal and microbial growth promoting effects, taste corrective and deodorant effects, plant hormone effects and the like. Medically, *chlorella* is known to have cell activation action, growth promotion action, immune function improvement action, detoxication action, antiulcer action and the like.

Likewise, the *chlorella* extract obtained by being extracted from *chlorella* algal cells with aqueous solvent also exhibits bioactive actions. Since *chlorella* extract exhibits growth promotion action on bacteria, yeast, protozoans and the like, it is called *chlorella* growth factor (CGF). Since the strength of the growth promotion action of *chlorella* extract corresponds to the absorbance of *chlorella* extract at 260 nm, *chlorella* growth factor concentrations are usually expressed by absorbance OD260 value.

Because this *chlorella* extract has been prepared by extraction with aqueous solvent, it contains amino acids, peptides, water-soluble proteins, saccharides, water-soluble vitamins, and nucleic acid-related substances, but it does not contain chlorophyll, fibers, and water-insoluble proteins, which are present in *chlorella* cells.

There are a wide variety of health foods making use of these bioactivities of *chlorella*; in addition to *chlorella* processed foods in the form of tablets and the like prepared by drying and powdering *chlorella* cells as they are, *chlorella* extract-containing foods prepared from a *chlorella* extract solution as the raw material are available.

*Chlorella* extract-containing beverages are disclosed in Japanese Patent Unexamined Publication Nos. HEI6-153876 and HEI7-79751, and are usually blended with *chlorella* extract, as well as with a sweetening agent, sour agent, antiseptic and other raw materials for beverage production and the like.

Disclosed in Japanese Patent Unexamined Publication Nos. SHO49-14661, HEI6-141812, HEI10-295298, and HEI11-46738 are various foods incorporating a *chlorella* extract-containing food additive as a food quality improver.

As stated above, a *chlorella* extract exhibits a wide variety of bioactivities, including growth promotion action on bacteria, yeast, protozoans and the like, so it is very rapidly perishable. For this reason, beverages containing a *chlorella* extract or food additives containing a *chlorella* extract are also perishable and are difficult to store. Furthermore, in the case of *chlorella* extract-containing beverages, even thermal sterilizing treatment is performed, bacteria, fungi and the like come therein after the stopper is removed, so it has been difficult to prevent the proliferation thereof.

For this reason, conventionally, *chlorella* extract-containing beverages have been stored, while coping with the flavor and stability issues, by combining a large number of sweetening agents and organic acids to adjust the drink to a pH of about 3, and adding a benzoate, which is a preservative in common use in beverages such as soft drinks and fruit juices.

However, benzoates have been shown to potentially produce benzene, a toxic compound known as a carcinogen, although in trace amounts, when ascorbic acid is co-present. For this reason, it is desirable that another preservative or a shelf life extender having sterilizing and antiseptic effects be used.

Meanwhile, as described in Japanese Patent Unexamined Publication No. HEI4-341169, capsicum extracts obtained by extraction with aqueous solvent are known to contain antifungal substances, and to be effective as food protecting agents. However, there is no knowledge of their influence on the quality, storability or shelf life of *chlorella* extracts.

SUMMARY OF THE INVENTION

As a result of continued research using a wide variety of food preservatives of natural derivation that are said to have a sterilizing or antiseptic effect, the present inventors found that capsicum extracts prevent the growth of microorganisms that proliferate in *chlorella* extracts without affecting the quality of the *chlorella* extracts.

An object of the present invention is to provide a *chlorella* extract-containing product of excellent safety and storage stability and a method for improving the storage stability thereof, without using a benzoate, which is a common preservative.

The *chlorella* extract-containing product of the present invention is characterized by the addition of a capsicum extract to a liquid having a *chlorella* extract as the principal ingredient thereof.

The method of the present invention for improving the storage stability of a *chlorella* extract-containing product comprises adding a capsicum extract to a liquid having a *chlorella* extract as the principal ingredient thereof.

The *chlorella* extract-containing product of the present invention is preferably one wherein the above-described liquid is an aqueous liquid for drinking to be used in a *chlorella* extract-containing beverage. Also, in the above-described method for improving the storage stability, it is preferable that the *chlorella* extract-containing product be an aqueous liquid for drinking. When used in a beverage, the *chlorella* extract-containing product of the present invention is preferably one wherein a capsicum extract is contained at 0.020% by weight or more, particularly at 0.020-1.63% by weight, relative to the *chlorella* extract, on a dry weight basis.

The *chlorella* extract-containing product of the present invention may be used as a food additive. In the above-described method for improving the storage stability, it is preferable that the *chlorella* extract-containing product be a food additive. This food additive can be used in a wide variety of foods; for example, the food additive can be added to cereal powders such as wheat flour in producing bread, ramen (Chinese noodles), udon (Japanese wheat noodle), cookies and the like, added to the batters of deep-fried foods, and added to miso, soy sauces, Japanese confectionery, coffee, whisky and the like.

When used as a food additive, the *chlorella* extract-containing product of the present invention is preferably one wherein a capsicum extract is contained at 0.065% by weight or more, particularly at 0.065-1.63% by weight, relative to the *chlorella* extract, on a dry weight basis.

The *chlorella* extract-containing product and method for improving the storage stability of the present invention have high safety and storage stability because a capsicum extract has been added to a food wherein a *chlorella* extract is the principal ingredient thereof. Additionally, despite the fact that an antiseptic effect is exhibited at levels similar to those with the addition of benzoate, there is no fear of benzene generation because no benzoate is contained.

When the *chlorella* extract-containing product of the present invention is one wherein the above-described liquid is drinking water to be used as a *chlorella* extract-containing beverage, and when the *chlorella* extract-containing product is an aqueous liquid for drinking in the method for improving the storage stability of the present invention, drinking water having high safety and storage stability is obtained. In particular, fungal growth can be suppressed even after unpacking.

When the *chlorella* extract-containing beverage contains a capsicum extract at 0.020% by weight or more relative to the *chlorella* extract, on a dry weight basis, fungal growth can be suppressed for a long time of about 1 month.

When the *chlorella* extract-containing product of the present invention is used as a *chlorella* extract-containing food additive, and when the *chlorella* extract-containing product is a food additive in the method for improving the storage stability of the present invention, the effect of the *chlorella* extract as a food quality improver is maintained, so the storage stability is excellent.

When the *chlorella* extract-containing food additive contains a capsicum extract at 0.065% by weight or more relative to the *chlorella* extract, on a dry weight basis, fungal growth can be suppressed for about 1 month.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE INVENTION

Hereinafter, some modes of embodiment of the present invention are described in detail. In this specification, "%" other than "% by weight" means "% by weight".

In a mode of embodiment of the *chlorella* extract-containing beverage of the present invention, a shelf life extender containing a capsicum extract is added to a *chlorella* extract-containing liquid adjusted to a pH of about 3 using an organic acid such as malic acid or citric acid.

The *chlorella* extract-containing liquid is a liquid, such as an aqueous solution, wherein a *chlorella* extract obtained by being extracted from *chlorella* algal cells with an aqueous solvent is contained as an ingredient thereof. The *chlorella* extract may assume any form of a *chlorella* extract liquid or a powder obtained by freeze-drying the same. Other forms are also acceptable.

Obtained by extraction with water solvent, the capsicum extract may assume any form of a capsicum extract liquid or a powder obtained by freeze-drying the same. Other forms are also acceptable. This capsicum extract has been shown to possess antifungal activity, and has been found to contain an ingredient effective in food protection, so it is highly effective in improving the shelf life of food.

Any *chlorella* extract-containing beverage wherein a capsicum extract is contained at 0.020% by weight or more relative to the *chlorella* extract on a dry weight basis exhibits fungicidal and antifungal effects to similar extents to those with the addition of a benzoate. In particular, it is preferable that the capsicum extract be contained at 0.020-1.63% by weight. Provided that the capsicum extract concentration in the *chlorella* extract-containing beverage is 10% by weight or less, the influence on the taste is small.

The shelf life extender comprises a capsicum extract and a extending agent therefor. The capsicum extract in the shelf life extender is preferably added at 3-40% by weight, more preferably at 3-30% by weight, and particularly preferably at 4-20% by weight.

Preferable extending agents include brewed vinegar and the like, which do not interfere with the effect of the capsicum extract. Brewed vinegar is preferably added at 50-90% by weight, particularly at 65-85% by weight. Other ingredients such as acetic acid, sodium acetate, glycerin fatty acid ester, and sucrose fatty acid ester, and the like may be added.

By adding this shelf life extender at 0.3-5.0% by weight, a *chlorella* extract beverage can be benefited by the fungicidal and antifungal effects of the capsicum extract, so as to suppress fungal growth, while the capsicum extract does not influence the taste and flavor. In particular, when the shelf life extender is added at 0.5-1.5% by weight, a beverage that constantly exhibits its effect irrespective of other additives is obtained.

Described below are specific blends for a *chlorella* extract-containing beverage. The *chlorella* extract used as the raw material is a *chlorella* extract liquid obtained by subjecting cleanly cultured *chlorella* to hot water extraction, which is a conventional method. A preferable *chlorella* species is *Chlorella pyrenoidosa*. The extract of this *chlorella* is preferably contained at 30-60% by weight or 30-50% by weight of the entire amount of the *chlorella* extract-containing liquid. By blending the *chlorella* extract with an optionally chosen ingredient such as a plant extract, a sweetening agent, a sour agent, a flavoring agent, a preservative and other raw materials for beverage manufacture, a *chlorella* extract-containing liquid is produced. Regarding the blending ratio, in particular, it is preferable to prepare an acidic liquid having a composition of fructose (or another sweetening agent) 10-25%, malic acid (or another sour agent) 0.5-1.5%, lemon essence (or another flavoring agent) 0.4-1.0%, and water 27-48%. Then, a *chlorella* extract beverage is produced by adding the above-described shelf life extender containing a capsicum extract to this *chlorella* extract-containing liquid. This *chlorella* extract-containing beverage wherein a capsicum extract is contained at 0.020% by weight or more relative to the *chlorella* extract on a dry weight basis exhibits fungicidal and antifungal effects to similar extents to those with the addition of a benzoate. In particular, it is preferable that the capsicum extract be contained at 0.020-1.63% by weight. In this *chlorella* extract-containing beverage, thanks to the synergistic effect of the shelf life extender, in particular the capsicum extract contained in the shelf life extender, and other ingredients contained in the *chlorella* extract-containing beverages, in particular fructose (or another sweetening agent) and malic acid (or another sour agent), greater antifungal effects were obtained than with the shelf life extender containing a capsicum extract used alone.

In addition to fructose, examples of the above-described sweetening agent include sucrose, oligosaccharides, glucose, high-fructose syrup, honey, glycyrrhizin, stevia, maltitol, starch syrup and the like. In addition to malic acid, examples of the sour agent include citric acid and the like. Examples of the flavoring agent include lemon flavor, citrus flavor and the like. However, these are not to be construed as limiting the scope of the invention.

By preparing a blend as described above, a *chlorella* extract-containing beverage having an antiseptic effect is obtained.

Next, a mode of embodiment of the food additive of the present invention wherein a capsicum extract is added to a *chlorella* extract is described.

The *chlorella* extract may assume any form of a *chlorella* extract liquid obtained by subjecting cleanly cultured *chlorella* to hot water extraction, which is a conventional method, or a powder obtained by freeze-drying the same. Other forms are also acceptable.

Prepared by extraction with water solvent, the capsicum extract may assume any form of a capsicum extract liquid or a powder obtained by freeze-drying the same. Other forms are also acceptable.

This food additive preferably contains a capsicum extract at 0.065% by weight or more relative to the *chlorella* extract on a dry weight basis. At these concentrations added, compared with food additives not containing the capsicum extract, a remarkable shelf life extending effect is observed. From the viewpoint of the influence on taste and the like, the capsicum extract concentration in the food additive is preferably 10% by weight or less, more preferably 1.0% by weight or less.

EXAMPLES

The present invention is hereinafter described with reference to the following Examples, to which, however, the invention is never limited.

[Process for *Chlorella* Extract Production]

The method used to produce a *chlorella* extract is as follows. First, *chlorella* algal cells (species *Chlorella pyrenoidosa*) were suspended in an aqueous solvent, and the suspension was heated to about 100° (degrees C.) with stirring, and allowed to stand for a given length of time. Subsequently, the algal cells were removed by fractionation. An aqueous solution of the extract obtained was concentrated, subjected to a deproteinization step and a sterilization step, and adjusted to a concentration such that specified bioactive ingredients were contained. In the present case, the *chlorella* extract was adjusted to obtain an OD260 of 400. As mentioned herein, an aqueous solution of *chlorella* extract having an OD260 of 400 means a *chlorella* extract concentration corresponding to an absorbance of 400 for an ultraviolet ray having a wavelength of 260 nm, as measured using a spectrophotometer.

[Separation and Cultivation of Fallen Bacteria in *Chlorella* Extract-Containing Liquid]

Containing the *chlorella* extract 33.0%, fructose 22.7%, malic acid 0.74%, lemon essence 0.47%, and water 43.0%, and maintained at a pH of about 3, the *chlorella* extract-containing liquid shown in Table 1 was prepared. The *chlorella* extract-containing liquid was allowed to stand in an open state indoors for 7 days, after which it was recovered, and stored at 25° (degrees C.).

Meanwhile, two kinds of fungi (fungus A and fungus B) that proliferated in the *chlorella* extract-containing liquid maintained at a pH of about 3 were separated and cultured on PDA medium (potato dextrose agar medium). These two kinds of fungi were added to a sterilized aseptic *chlorella* extract-containing liquid, and the liquid was stored for 1 month. In this case, it was fungus A only that proliferated within 1 month, so it was decided to use this fungus A in conducting a fungal growth test for 1 month after that time.

TABLE 1

| Ingredients of *chlorella* extract-containing liquid | |
|---|---|
| *Chlorella* extract | 33.03% |
| Fructose | 22.73% |
| Malic acid | 0.74% |
| Lemon essence | 0.47% |
| Water | 43.03% |

[Choice of Food Preservative Suitable for *Chlorella* Extract]

Food preservatives of natural derivation (I-XI), food preservatives (XII-XIV), and sodium benzoate (XV) were added to 10 ml of the *chlorella* extract-containing liquid to yield *chlorella* extract-containing beverages. Furthermore, a *chlorella* extract-containing beverage with no additive (XVI) was prepared. The ingredients and amounts added of the individual food preservatives are shown in Table 2.

TABLE 2

| Number | Ingredient | Amount added (% by weight) | Name of additive (trade mark) | Manufacturer |
|---|---|---|---|---|
| I | Mustard extract | 0.03 | Wasaouro Emulsion | Mitsubishi-Kagaku Foods Corporation |
| II | Bamboo (*Phyllostachys* pubescens) | 0.3 | Takex Keep | Takex Labo Co., Ltd. |
| III | Milt protein (salmon-derived) | 0.3 | Impact-A | Asama Chemical Co., Ltd. |
| IV | *Capsicum* extract | 0.1 | Ajinanba 501 | Asama Chemical Co., Ltd. |
| V | Pectin degradation product | 0.3 | Neupectin-L | Asama Chemical Co., Ltd. |
| VI | Persimmon extract | 0.1 | Pancil PS-SP | Rilis Co., Ltd. |
| VII | Persimmon extract | 0.1 | Pancil BA-200-E-1 | Rilis Co., Ltd. |
| VIII | Tea extract | 0.1 | Polyphenon 70A | Mitsui Norin Co., Ltd. |
| IX | Tea extract | 0.1 | Polyphenon CG | Mitsui Norin Co., Ltd. |
| X | Licorice oily extract | 0.1 | Sanlicorice-N | Mitsui Norin Co., Ltd. |
| XI | Licorice oily extract | 0.1 | Sanlicorice-A | Mitsui Norin Co., Ltd. |

TABLE 2-continued

| Number | Ingredient | Amount added (% by weight) | Name of additive (trade mark) | Manufacturer |
|---|---|---|---|---|
| XII | ε-Polylysin | 0.03 | ε-Polylysin | Chisso Corporation |
| XIII | Nonionic surfactants consisting of sucrose and palmitic acid | 0.01 | Monoester-P | Mitsubishi-Kagaku Foods Corporation |
| XIV | | 0.01 | Sugar Ester P-1670 | Mitsubishi-Kagaku Foods Corporation |
| XV | Sodium benzoate | 0.04 | | Wako Pure Chemical Industries, Ltd. |
| XVI | No addition | — | | |

Fungus A was separated and proliferated from the above-described *chlorella* extract-containing liquid with fungus A cultured therein, and further cultured on PDA medium for 1 month, and a fungal liquid was prepared to obtain a fungus A concentration of 103-105/ml. This fungal liquid, 0.1 ml, was inoculated to *chlorella* extract-containing foods thermally sterilized at 85° (degrees C.) for 15 minutes, and the foods were stored at 25° degrees C.). Each food was macroscopically examined for the growth of fungus A after 7 days, 14 days, 21 days and 28 days of storage. The results are shown in Table 3. In the table, "+" indicates that the fungus grew, and "−" indicates that the fungus did not grow.

TABLE 3

| Test microorganism | *Chlorella* extract-containing beverage | Presence or absence of growth of fungus A | | | |
|---|---|---|---|---|---|
| | | After 7 days | After 14 days | After 21 days | After 28 days |
| Fungus A | I | + | + | + | + |
| | II | + | + | + | + |
| | III | − | + | + | + |
| | IV | − | − | − | + |
| | V | + | + | + | + |
| | VI | Discontinued because of precipitation | | | |
| | VII | Unsuitable for drinking | | | |
| | VIII | Discontinued because of discoloration and turbidity | | | |
| | IX | Discontinued because of discoloration and turbidity | | | |
| | X | − | + | + | + |
| | XI | − | + | + | + |
| | XII | + | + | + | + |
| | XIII | − | − | − | + |
| | XIV | − | − | + | + |
| | XV | − | − | − | − |
| | XVI | + | + | + | + |

These results demonstrate that in the *chlorella* extract-containing beverages containing a capsicum extract (IV) or a nonionic surfactant consisting of sucrose and palmitic acid (XIII), fungal growth was suppressed until 21 days after the start of storage, although these beverages were not comparable to the *chlorella* extract-containing beverage containing sodium benzoate (XV). Meanwhile, because the nonionic surfactant (XIII) cannot be said to be a completely natural product, the food preservative of the capsicum extract (IV) is suitable for liquids with a *chlorella* extract as the principal ingredient thereof.

[Choosing Amounts of Capsicum Extract Added]

A shelf life extender containing a capsicum extract, Ajinanba 501 ("Ajinanba" is a trademark for a series of shelf life extenders manufactured by Asama Chemical Co., Ltd.; the same applies below), was added to 10 ml of a *chlorella* extract-containing liquid at 0.1-5.0% by weight to yield eight *chlorella* extract beverages in Examples; these solutions were thermally sterilized at 85° (degrees C.) for 15 minutes (see Table 5). The ingredients of Ajinanba 501 are shown in Table 4. The *chlorella* extract-containing liquid as it was, which did not contain the shelf life extender, was evaluated in Comparative Example 1.

TABLE 4

| Table of ingredients of Ajinanba 501 | |
|---|---|
| Sodium acetate | 20.0% |
| Acetic acid | 4.5% |
| *Capsicum* water extract | 4.0% |
| Hop extract | 1.0% |
| Glycerol fatty acid ester | 2.0% |
| Sucrose fatty acid ester | 1.2% |
| Brewed vinegar | 67.3% |

Fungus A was separated and proliferated from the above-described *chlorella* extract-containing liquid with fungus A cultured therein, and further cultured on PDA medium for 1 month, and a fungal liquid was prepared to obtain a fungus A concentration of 103-105/ml; 0.1 ml of the liquid was inoculated in Examples and Comparative Example, and stored at 25° (degrees C.). Each solution was macroscopically examined for the growth of fungus A after 7 days, 14 days, 21 days and 28 days of storage. The results are shown in Table 5. In the table, "+" indicates that the fungus grew, and "−" indicates that the fungus did not grow.

TABLE 5

| Test micro-organism | Beverage (% by weight of Ajinanba 501) | Dry weight ratio (% by weight) of *capsicum* extract to *chlorella* extract | *Capsicum* extract (% by weight) | Presence or absence of growth of fungus A | | | | Hot taste |
|---|---|---|---|---|---|---|---|---|
| | | | | After 7 days | After 14 days | After 21 days | After 28 days | |
| Fungus A | Example 1 (0.1%) | 0.033 | 0.004 | − | − | − | + | ◯ |
| | Example 2 (0.2%) | 0.064 | 0.008 | − | − | − | − | ◯ |
| | Example 3 (0.3%) | 0.049 | 0.012 | − | − | − | − | ◯ |
| | Example 4 (0.5%) | 0.099 | 0.02 | − | − | − | − | ◯ |
| | Example 5 (1.0%) | 0.20 | 0.04 | − | − | − | − | ◯ |
| | Example 6 (2.0%) | 0.41 | 0.08 | − | − | − | − | ◯ |

TABLE 5-continued

| Test micro-organism | Beverage (% by weight of Ajinanba 501) | Dry weight ratio (% by weight) of capsicum extract to chlorella extract | Capsicum extract (% by weight) | Presence or absence of growth of fungus A | | | | Hot taste |
|---|---|---|---|---|---|---|---|---|
| | | | | After 7 days | After 14 days | After 21 days | After 28 days | |
| | Example 7 (3.0%) | 0.62 | 0.12 | − | − | − | − | ○ |
| | Example 8 (5.0%) | 1.04 | 0.2 | − | − | − | − | ○ |
| | Comparative Example 1 (0%) | | | + | + | + | + | ○ |

(−: no fungal growth was observed; +: fungal growth was observed; ○ (circle): no hot taste was sensed; Δ (triangle): a hot taste was sensed)

From these results, it is seen that in the *chlorella* extract-containing beverages containing a food preservative containing a capsicum extract (Ajinanba 501), fungal growth was suppressed. In particular, in the *chlorella* extract-containing beverages supplemented with the shelf life extender (Ajinanba 501) at 0.2% by weight or more, no fungal growth was observed even after 28 days passed after inoculation of the fungus. In all of Examples 1 to 8, there was no influence of the capsicum extract on the taste and flavor.

Next, embodiments of *chlorella* extract food additives are described below.

Test Example 1

Sixteen kinds of food additives were prepared by adding shelf life extender containing a capsicum extract (Ajinanba 301A and 501) to 10 ml of a *chlorella* extract (OD260=400) at 0.1-5.0% respectively. These were evaluated in Examples 9 to 24. These food additives were heated to 85° (degrees C.), and kept to stand for 15 minutes to achieve thermal sterilization. The ingredients of Ajinanba 301A are shown in Table 6. The *chlorella* extract not supplemented with the shelf life extender was evaluated in Comparative Example 1.

Table of Ingredients of Ajinanba 301A

TABLE 6

| Capsicum extract | 20.0% |
|---|---|
| Brewed vinegar | 80.0% |

A fungal liquid having a fungus A concentration of 103-105/ml was prepared as described above. 0.1 ml of the fungal liquid was inoculated to the food additives in Examples 9 to 24 and the *chlorella* extract food additive in Comparative Example 2, and stored in an incubator at 25° (degrees C.). Each solution was macroscopically examined for the growth of fungus A after 7 days, 14 days, 21 days and 28 days of storage. The results are shown in Table 7. In the table, "+" indicates that fungal growth was observed, and "−" indicates that no fungal growth was observed.

TABLE 7

| Test micro-organism | Food additive (shelf-life extender and its % by weight) | Dry weight ratio (% by weight) of capsicum extract to chlorella extract | Presence or absence of growth of fungus A | | | |
|---|---|---|---|---|---|---|
| | | | 7 days | 14 days | 21 days | 28 days |
| Fungus A | Example 9 (301A, 0.1%) | 0.033 | + | + | + | + |
| | Example 10 (301A, 0.3%) | 0.098 | − | − | − | − |
| | Example 11 (301A, 0.5%) | 0.163 | − | − | − | − |
| | Example 12 (301A, 0.7%) | 0.228 | − | − | − | − |
| | Example 13 (301A, 1.0%) | 0.326 | − | − | − | − |
| | Example 14 (301A, 2.0%) | 0.652 | − | − | − | − |
| | Example 15 (301A, 3.0%) | 0.978 | − | − | − | − |
| | Example 16 (301A, 5.0%) | 1.63 | − | − | − | − |
| | Example 17 (501, 0.1%) | 0.0065 | + | + | + | + |
| | Example 18 (501, 0.3%) | 0.020 | + | + | + | + |
| | Example 19 (501, 0.5%) | 0.033 | + | + | + | + |
| | Example 20 (501, 0.7%) | 0.046 | − | + | + | + |
| | Example 21 (501, 1.0%) | 0.065 | − | − | − | − |
| | Example 22 (501, 2.0%) | 0.13 | − | − | − | − |
| | Example 23 (501, 3.0%) | 0.20 | − | − | − | − |
| | Example 24 (501, 5.0%) | 0.326 | − | − | − | − |
| | Comparative Example 2 (0%) | — | + | + | + | + |

(+: fungal growth was observed; −: no fungal growth was observed)

From these results, it is seen that the *chlorella* extracts (food additives) containing a shelf life extender containing a capsicum extract (Ajinanba 301A and 501) suppressed fungal growth. In particular, in the food additives supplemented with the shelf life extender Ajinanba 301A at 0.3% or more (dry weight ratio of capsicum extract to *chlorella* extract 0.098% by weight), or with Ajinanba 501 at 1.0% or more (dry weight ratio of capsicum extract to *chlorella* extract 0.065% by weight), no fungal growth was observed even after 28 days passed after inoculation of the fungus. In all of Examples 9 to 24, there was no influence of the capsicum extract on the taste and flavor.

Test Example 2

Chlorella Extract-Containing Beverages

Next, 16 kinds of food additives were produced by adding shelf life extenders containing a capsicum extract (Ajinanba 301A and 501) to a *chlorella* extract to obtain final concentrations of 0.1-5.0% of each extender. Using these food additives, the *chlorella* extract-containing beverages configured as shown in Table 8 were prepared. These were evaluated in Examples 25 to 40. Meanwhile, a *chlorella* extract-containing beverage incorporating a *chlorella* extract not supplemented with any shelf life extender was prepared, and this was evaluated in Comparative Example 3. These were thermally sterilized by being retained at 85° (degrees C.) for 15 minutes, and tested using fungus A in the same manner as the above. The results are shown in Table 9.

TABLE 8

| | |
|---|---|
| Food additive | 34.0% |
| Fructose | 22.0% |
| Malic acid | 0.74% |
| Lemon essence | 0.47% |
| Water | 42.79% |

Results of fungus A growth test of *chlorella* extract-containing beverages

TABLE 9

| Test micro-organism | Chlorella extract-containing beverage (shelf-life extender and its % by weight) | Capsicum extract concentration (% by weight) | Presence or absence of growth of fungus A | | | |
|---|---|---|---|---|---|---|
| | | | 7 days | 14 days | 21 days | 28 days |
| Fungus A | Example 25 (301A, 0.1%) | 0.0068% | − | − | − | − |
| | Example 26 (301A, 0.3%) | 0.0204% | − | − | − | − |
| | Example 27 (301A, 0.5%) | 0.034% | − | − | − | − |
| | Example 28 (301A, 0.7%) | 0.0476% | − | − | − | − |
| | Example 29 (301A, 1.0%) | 0.068% | − | − | − | − |
| | Example 30 (301A, 2.0%) | 0.136% | − | − | − | − |
| | Example 31 (301A, 3.0%) | 0.204% | − | − | − | − |
| | Example 32 (301A, 5.0%) | 0.34% | − | − | − | − |
| | Example 33 (501, 0.1%) | 0.00136% | − | − | − | − |
| | Example 34 (501, 0.3%) | 0.0408% | − | − | − | − |
| | Example 35 (501, 0.5%) | 0.0068% | − | − | − | − |
| | Example 36 (501, 0.7%) | 0.00952% | − | − | − | − |
| | Example 37 (501, 1.0%) | 0.0136% | − | − | − | − |
| | Example 38 (501, 2.0%) | 0.0272% | − | − | − | − |
| | Example 39 (501, 3.0%) | 0.0408% | − | − | − | − |
| | Example 40 (501, 5.0%) | 0.068% | − | − | − | − |
| | Comparative Example 3 (0%) | — | + | + | + | + |

(+: fungal growth was observed; −: no fungal growth was observed)

From these results, it was seen that fungal growth was suppressed in the *chlorella* extract-containing beverages containing food additives supplemented with the shelf life extenders containing a capsicum extract (Ajinanba 301A and 501). Particularly, thanks to the synergistic effect of said food additives supplemented with the shelf life extenders, in particular the capsicum extract contained in the shelf life extender, and other ingredients contained in the *chlorella* extract-containing beverages, in particular fructose and malic acid, greater antifungal effects were obtained than with the food additives, i.e. the shelf life extenders containing a capsicum extract, used alone.

As is evident from the results in Table 7 and Table 9, the food additives prepared by adding the shelf life extenders containing a capsicum extract to the *chlorella* extract maintained their effects as *chlorella* extract quality improvers, and increased the safety and storage quality without affecting the tastes of the foods.

While specific embodiments of the invention have been described in detail to illustrate the application of the principles of the invention, it will be understood that the invention may be embodied otherwise without departing from such principles.

What is claimed is:

1. A composition consisting essentially of brewed vinegar, a capsicum extract and *chlorella pyrenoidosa* extract which is obtained by suspending *chlorella* algal cells of *chlorella pyrenoidosa* in an aqueous solvent to obtain a suspension, the suspension obtained being heated to about 100 degrees Celsius with stirring, allowed to stand for a given length of time and the algal cells being removed therefrom by fractionation to obtain an aqueous solution, the obtained aqueous solution being concentrated, subjected to a deproteinization step and a sterilization step to yield said extract.

2. The composition according to claim 1, wherein said composition is an aqueous liquid for drinking.

3. The composition according to claim 1, wherein said composition is a *chlorella* extract-containing food additive.

4. The composition according to claim 1, wherein said capsicum extract is contained at 0.020-1.63% by weight on a dry weight basis relative to said *chlorella* extract.

5. The composition according to claim 2, wherein said capsicum extract is contained at 0.020-1.63% by weight on a dry weight basis relative to said *chlorella* extract.

6. The composition according to claim 3, wherein said capsicum extract is contained at 0.065-1.63% by weight on a dry weight basis relative to said *chlorella* extract.

7. The composition according to claim 1, wherein said *chlorella* extract is contained at 30-60% by weight.

8. The composition according to claim 7, further containing malic acid at 0.5-1.5% by weight.

9. The composition according to claim 1, wherein said capsicum extract has been added to a liquid having a *chlorella* extract as a principal ingredient by adding a shelf life extender consisting essentially of a capsicum extract and brewed vinegar, said shelf life extender including said capsicum extract at 3-40% by weight and said brewed vinegar at 50-90% by weight.

10. The composition according to claim 9, wherein said capsicum extract was obtained by extraction with water solvent.

11. The composition according to claim 4, wherein said capsicum extract has been added to a liquid having a *chlorella* extract as a principal ingredient by adding a shelf life extender consisting essentially of a capsicum extract and brewed vinegar, said shelf life extender including said capsicum extract at 3-40% by weight and said brewed vinegar at 50-90% by weight.

12. The composition according to claim 11, wherein said capsicum extract was obtained by extraction with water solvent.

\* \* \* \* \*